United States Patent
Jeong et al.

(10) Patent No.: US 10,812,989 B2
(45) Date of Patent: Oct. 20, 2020

(54) METHOD AND APPARATUS FOR FORECASTING CELL CAPACITY SATURATION IN WIRELESS COMMUNICATION SYSTEM

(71) Applicant: Samsung Electronics Co., Ltd., Suwon-si, Gyeonggi-do (KR)

(72) Inventors: Seoungho Jeong, Suwon-si (KR); Wontai Kim, Suwon-si (KR); Jingoo Seo, Suwon-si (KR); Jaeyoung Seol, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/736,236

(22) Filed: Jan. 7, 2020

(65) Prior Publication Data

US 2020/0221315 A1    Jul. 9, 2020

(30) Foreign Application Priority Data

Jan. 9, 2019   (KR) ........................ 10-2019-0002659

(51) Int. Cl.
*H04W 16/22* (2009.01)
*H04W 24/02* (2009.01)
*H04W 16/18* (2009.01)

(52) U.S. Cl.
CPC .......... *H04W 16/22* (2013.01); *H04W 16/18* (2013.01); *H04W 24/02* (2013.01)

(58) Field of Classification Search
CPC ..... H04W 16/22; H04W 24/02; H04W 16/18; H04L 41/5025; H04L 41/5054; H04L 41/5032

(Continued)

(56) References Cited

U.S. PATENT DOCUMENTS 7,142,868 B1 * 11/2006 Broyles ................ H04W 16/00
   455/453
9,137,677 B2   9/2015 Wille et al.
(Continued)

FOREIGN PATENT DOCUMENTS

KR    10-2017-0126408 A    11/2017

OTHER PUBLICATIONS

Michael Borkowski et al., 'Predicting Cloud Resource Utilization', Conference: 9th IEEE/ACM International Conference on Utility and Cloud Computing, Dec. 2016, Retrieved from URL: https://www.researchgate.net/publication/307464948, retrieved on Apr. 11, 2020, sections 1-3.4.

(Continued)

*Primary Examiner* — Michael Y Mapa
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE).
A method and an apparatus for forecasting capacity saturations of cells in a wireless communication system based on per-cell resource utilizations and determining whether to deploy a new cell based on a forecast result are provided. The method includes acquiring first data related to a resource utilization of a cell from the cell, deducing a certain pattern corresponding to a predetermined time period from the first data, acquiring second data by converting the first data based on a shape of an abnormal pattern corresponding to the certain pattern among multiple preconfigured abnormal patterns, and forecasting whether the cell capacity is saturated based on the second data.

14 Claims, 14 Drawing Sheets

(58) Field of Classification Search
USPC .................. 455/414.1, 418, 446, 450–452.2, 455/456.1–457
See application file for complete search history.

(56) References Cited

U.S. PATENT DOCUMENTS

| | | |
|---|---|---|
| 9,655,020 B2 | 5/2017 | Wegmann et al. |
| 9,900,790 B1* | 2/2018 | Sheen ................. H04L 41/5009 |
| 2005/0120111 A1* | 6/2005 | Bailey ................ G06F 11/3409 |
| | | 709/224 |
| 2012/0064893 A1 | 3/2012 | Reagor |
| 2016/0157126 A1 | 6/2016 | Nuss et al. |
| 2017/0134970 A1 | 5/2017 | Zhang et al. |
| 2018/0332483 A1 | 11/2018 | Yoon et al. |
| 2019/0158578 A1 | 5/2019 | Ramasamy |
| 2020/0187055 A1* | 6/2020 | Meredith .................. H04L 1/08 |

OTHER PUBLICATIONS

International Search Report and Written Opinion dated Apr. 17, 2020, issued in International Patent Application No. PCT/KR2020/000242.

* cited by examiner

[a]

[b1]

[b2]

[b3]

[c]

[d]

(a)

(b)

(c)

(d)

METHOD AND APPARATUS FOR FORECASTING CELL CAPACITY SATURATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0002659, filed on Jan. 9, 2019, in the Korean Intellectual Property Office, the disclosure of which is incorporated by reference herein in its entirety.

BACKGROUND

1. Field

The disclosure relates to a method and apparatus for forecasting capacity saturations of cells based on per-cell resource utilizations and determining whether to deploy a new cell based on a forecast result in a wireless communication system.

2. Description of Related Art

To meet the increased demand for wireless data traffic since the deployment of 4th Generation (4G) communication systems, efforts have been made to develop an improved 5th Generation (5G) or pre-5G communication system. Therefore, the 5G or pre-5G communication system is also called a "Beyond 4G Network" or a "Post Long Term Evolution (LTE) System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid Frequency-Shift Keying (FSK) and Quadrature Amplitude Modulation (QAM) (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology," "wired/wireless communication and network infrastructure," "service interface technology," and "security technology" have been demanded for IoT implementation, recently there has been research into a sensor network, Machine-to-Machine (M2M) communication, Machine Type Communication (MTC), and so forth.

Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

Meanwhile, in next generation mobile communication, as wireless communication terminals are exponentially growing in number, there is a need of efficiently managing base stations, which are also increasing in number, to support the large number of wireless communication terminals. In particular, the forecasting and managing of capacities of cells of each base station based on per-cell resource utilizations may become an important issue.

However, the technologies according to the related art have a drawback in that the cell saturation forecast is inaccurate because the cell capacity saturation is forecast using a uniform rule based on a result of monitoring data of key performance indicator (KPI) items regardless of any occurrence of an abnormal pattern caused by a specific event within the corresponding cell.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for detecting an abnormal pattern of a cell and forecasting abnormal pattern-specific cell saturation by applying an Artificial Intelligence (AI) module with various abnormal patterns that may occur in cells.

Another aspect of the disclosure is to provide a method for categorizing data processed per abnormal pattern into one of increasing and decreasing patterns of cell saturation to make a determination about deployment of a new cell.

Additional aspects will be set forth in part in the description which follows and, in part, will be apparent from the description, or may be learned by practice of the presented embodiments.

In accordance with an aspect of the disclosure, a method for forecasting saturation of a cell capacity in a wireless communication system is provided. The method includes acquiring first data related to resource utilization of a cell from the cell, identifying a specific pattern corresponding to a predetermined time period from the first data, acquiring second data by converting the first data based on a shape of an abnormal pattern corresponding to the specific pattern among multiple preconfigured abnormal patterns and forecasting whether the cell capacity is saturated based on the second data.

In accordance with another aspect of the disclosure, an apparatus for forecasting saturation of a cell capacity in a wireless communication system is provided. The apparatus includes an abnormal pattern detector configured to acquire first data related to resource utilization of a cell from the cell, deduce a specific pattern corresponding to a predetermined time period from the first data, and acquire second data by converting the first data based on a shape of an abnormal pattern corresponding to the specific pattern among multiple preconfigured abnormal patterns and a saturation forecasting unit configured to forecast whether the cell capacity is saturated based on the second data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

FIGS. A and 1B are diagrams illustrating resource utilization situation-based additional cell deployment according to various embodiments of the disclosure.

Throughout the drawings, it should be noted that like reference numbers are used to depict the same or similar elements, features, and structures.

DETAILED DESCRIPTION

Figure 1A:
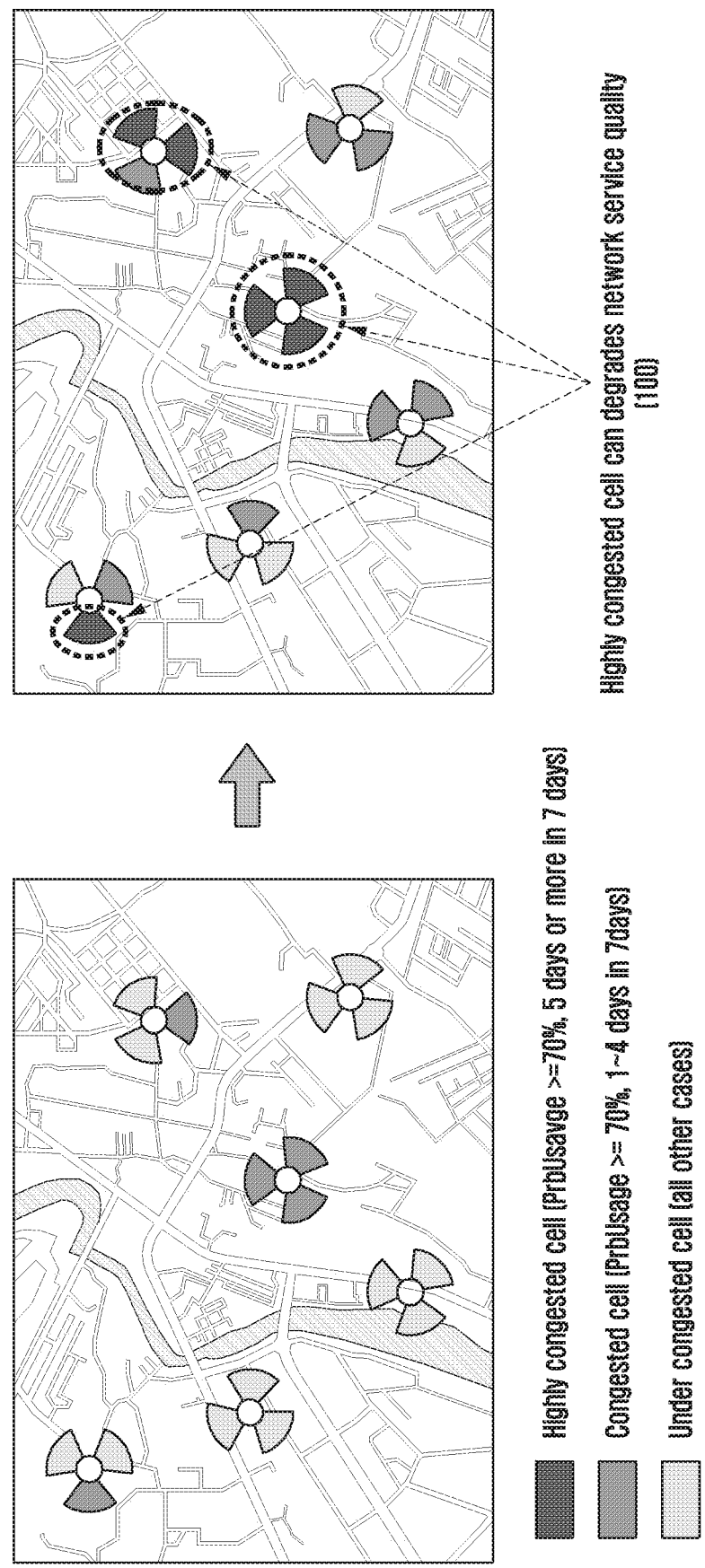

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Detailed descriptions of well-known functions and structures incorporated herein may be omitted to avoid obscuring the subject matter of the disclosure. The following terms are defined in consideration of the functionality in the disclosure, and they may vary according to the intention of a user or an operator, usage, etc. Therefore, the definition should be made on the basis of the overall content of the present specification.

It will be understood by those skilled in the art that the disclosure can be applied even to other communication systems having a similar technical background and channel format, with a slight modification, without departing from the spirit and scope of the disclosure.

Advantages and features of the disclosure and methods of accomplishing the same may be understood more readily by reference to the following detailed description of various embodiments and the accompanying drawings. The disclosure may, however, be embodied in many different forms and should not be construed as being limited to the various embodiments set forth herein. Rather, these various embodiments are provided so that the disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams.

These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams.

The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more central processing units (CPUs) in a device or a secure multimedia card.

Figure 1B:
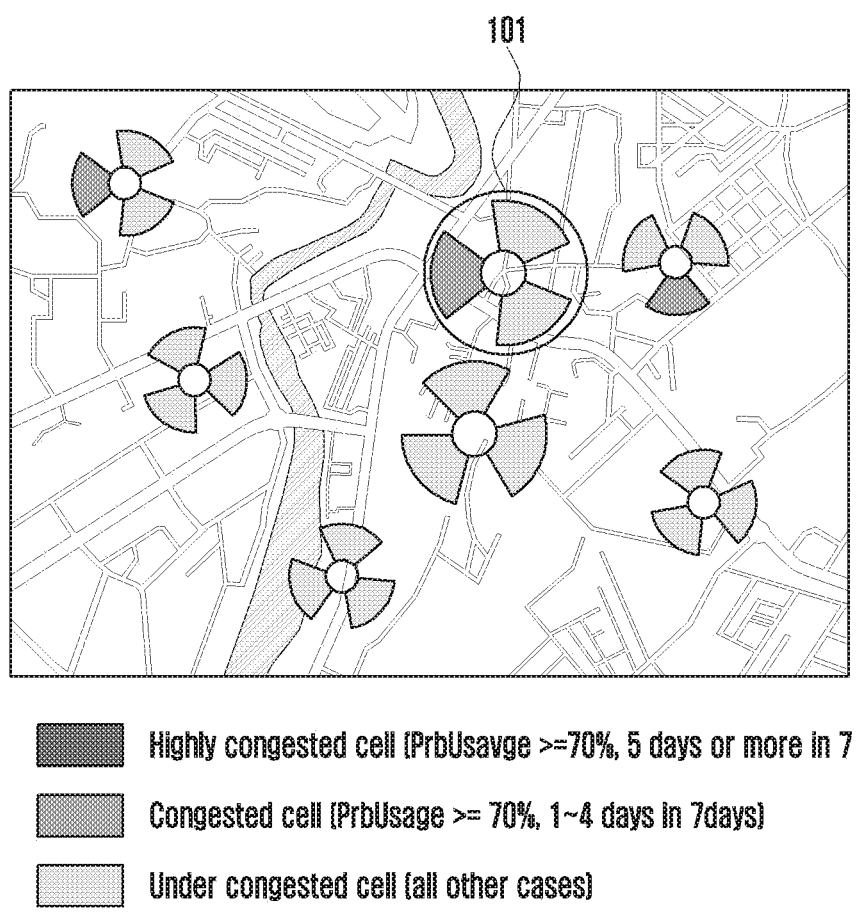

FIGS. 1A and 1B are diagrams illustrating resource utilization situation-based additional cell deployment according to various embodiments of the disclosure.

Referring to FIG. 1A, six cells are deployed in an area configured to monitor cells for cell capacity saturation. Referring to FIG. 1A, the cells may each determine whether their capacities are saturated based on their cell resource utilizations. A degree of saturation of a cell is determined according to resource utilization of the cell. For example, if resource utilization equal to or greater than 70% lasts for 5 days or longer in a 7-day window, this is categorized into a cell saturation degree referred to as "highly congested"; if resource utilization equal to or greater than 70% lasts for 1 to 4 days in a 7-day window, this is categorized into a cell saturation degree referred to as "congested"; and if resource utilization equal to or greater than 70% lasts for less than 1 day, this is categorized into a cell saturation degree referred to as "under-congested".

It may be forecast that the congestion states of the cells deployed in the corresponding area that are as shown in the left part of FIG. 1A may be changed as shown in the right part of FIG. 1A after about 1 week based on the resource utilization in the corresponding area. That is, it is forecast that at least 3 cells will become highly congested cells 100.

Referring to FIG. 1B, according to an embodiment, if certain cells are forecast to become highly congested cells, it may be possible to reduce the resource utilization of the potential highly congested cells and deploy a new cell 101 to distribute load in the corresponding area.

A description is made of the method for forecasting cell capacity saturation and making a determination on deployment of a new cell based on the forecast with reference to the accompanying drawings. In the following descriptions, the terms "cell" and "base station" are interchangeably used for convenience of explanation.

Figure 2A:
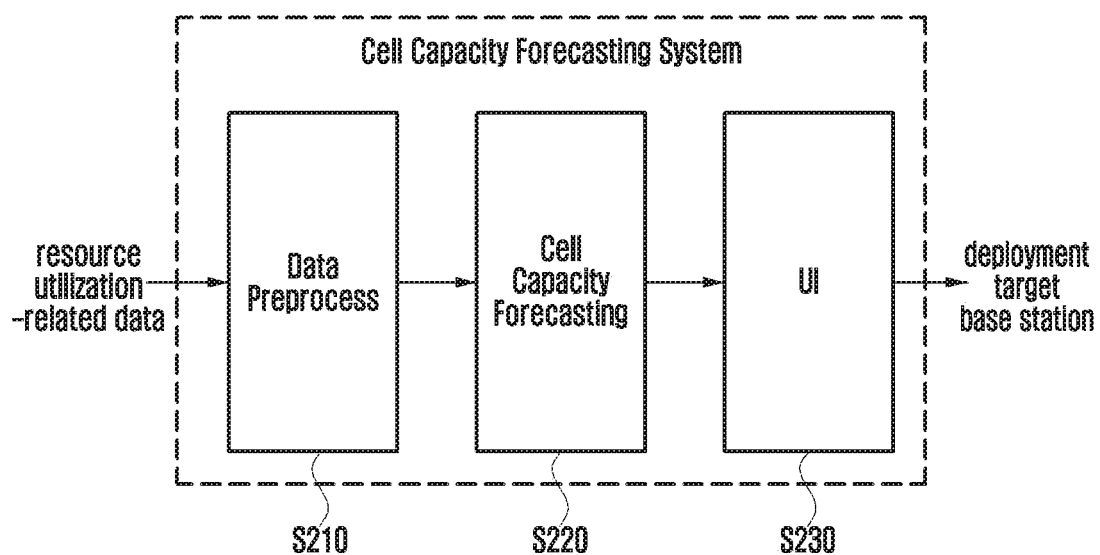
FIG. 2A is a conceptual diagram illustrating a method for forecasting cell capacity saturation according to an embodiment of the disclosure.
Figure 2B:
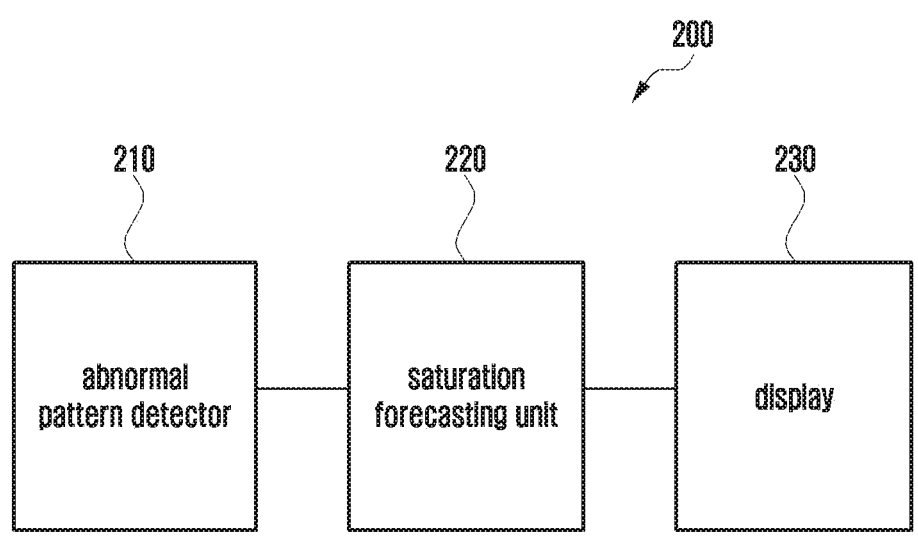
FIG. 2B is a schematic block diagram illustrating a configuration of a device for forecasting cell capacity saturation according to an embodiment of the disclosure.

FIG. 2A is a conceptual diagram illustrating a method for forecasting cell capacity saturation according to an embodiment of the disclosure, and FIG. 2B is a schematic block diagram illustrating a configuration of a device for forecasting cell capacity saturation according to an embodiment of the disclosure.

Referring to FIG. 2A, a cell saturation forecasting system may acquire data related to resource utilization per cell. The acquired data may be preprocessed, at operation S210, using a method proposed in an embodiment of the disclosure.

According to an embodiment, a data preprocessing operation may be an operation for acquiring data about a predetermined pattern from the corresponding data to determine whether an abnormal situation has occurred in radio communication per cell. According to an embodiment, the data preprocessing operation may be an operation for performing data conversion based on a pattern acquired from the corresponding data to remove a data value according to the abnormal situation. The data preprocessing operation is described later in detail with reference to FIG. 4.

According to an embodiment, if the data preprocessing operation is completed, the cell capacity saturation forecasting system may forecast at operation S220 whether the cell capacity will be saturated over a predetermined period based on the preprocessed data.

For example, the cell capacity saturation forecasting system may determine whether the resource utilization of the corresponding cell shows a predetermined increasing/decreasing pattern. The cell capacity saturation forecasting system may also forecast the capacity saturation of the corresponding cell by analyzing the increasing/decreasing pattern of the resource utilization of the corresponding cell and determine whether to deploy a new cell associated with the corresponding cell based on a result of the forecast.

If making a determination about deployment of a new cell based on a result of the forecast about the capacity saturation of the corresponding cell, the cell capacity saturation forecasting system schematizes the information about the capacity saturation of the corresponding cell and a new cell to be deployed and displays the schematized graphics on a user interface (UI) at operation S230.

Referring to FIG. 2B, according to an embodiment, the cell capacity saturation forecasting system (hereinafter, referred to as forecasting device) may be configured.

Referring to FIG. 2B, the forecasting device 200 may include an abnormal pattern detector 210, a saturation forecasting unit 220, and a display 230.

According to an embodiment, the abnormal pattern detector 210 may use resource utilization-related data of a target cell for forecasting from the corresponding cell and perform a data preprocessing operation on the resource utilization-related data to detect an abnormal situation of the corresponding cell. For example, the abnormal pattern detector 210 may convert the resource utilization-related data received from the target cell for forecasting to a specific pattern and determine whether the pattern corresponds to one of multiple predetermined patterns to detect occurrence of an abnormal situation in the corresponding cell.

According to an embodiment, the forecasting device 200 may have data on multiple abnormal patterns associated with the abnormal situations of the cell. According to an embodiment, the forecasting device 200 may learn and categorize the abnormal patterns associated with the abnormal situations by type based on data or domain knowledge about various radio communication situations of the cell and store the categorization results.

According to an embodiment, the abnormal pattern detector 210 may perform a conversion operation on the data from which an abnormal pattern is detected to remove a value associated with the abnormal pattern from the corresponding data to facilitate a cell saturation forecast. The conversion operation is described in detail later with reference to FIGS. 5A and 5B.

The converted data may be sent to the saturation forecasting unit 220. According to an embodiment, the saturation forecasting unit 220 may compare the data acquired from the abnormal pattern detector 210 with multiple increasing/decreasing patterns that have been stored previously. If an increasing/decreasing pattern corresponding to the acquired data is retrieved, the saturation forecasting unit 220 may forecast capacity saturation of the corresponding cell in the future based on the increasing/decreasing pattern to determine whether to deploy a new cell. A cell capacity saturation forecasting method proposed in an embodiment is described later with reference to FIGS. 7 and 8.

According to an embodiment, the display 230 may receive information on the capacity saturation of the corresponding cell and a new cell to be deployed and schematize the information in the form of a graph or a table to be presented to a user.

Descriptions are made of the abnormal pattern detection method and the cell capacity saturation forecasting method hereinafter in detail.

Figure 3:
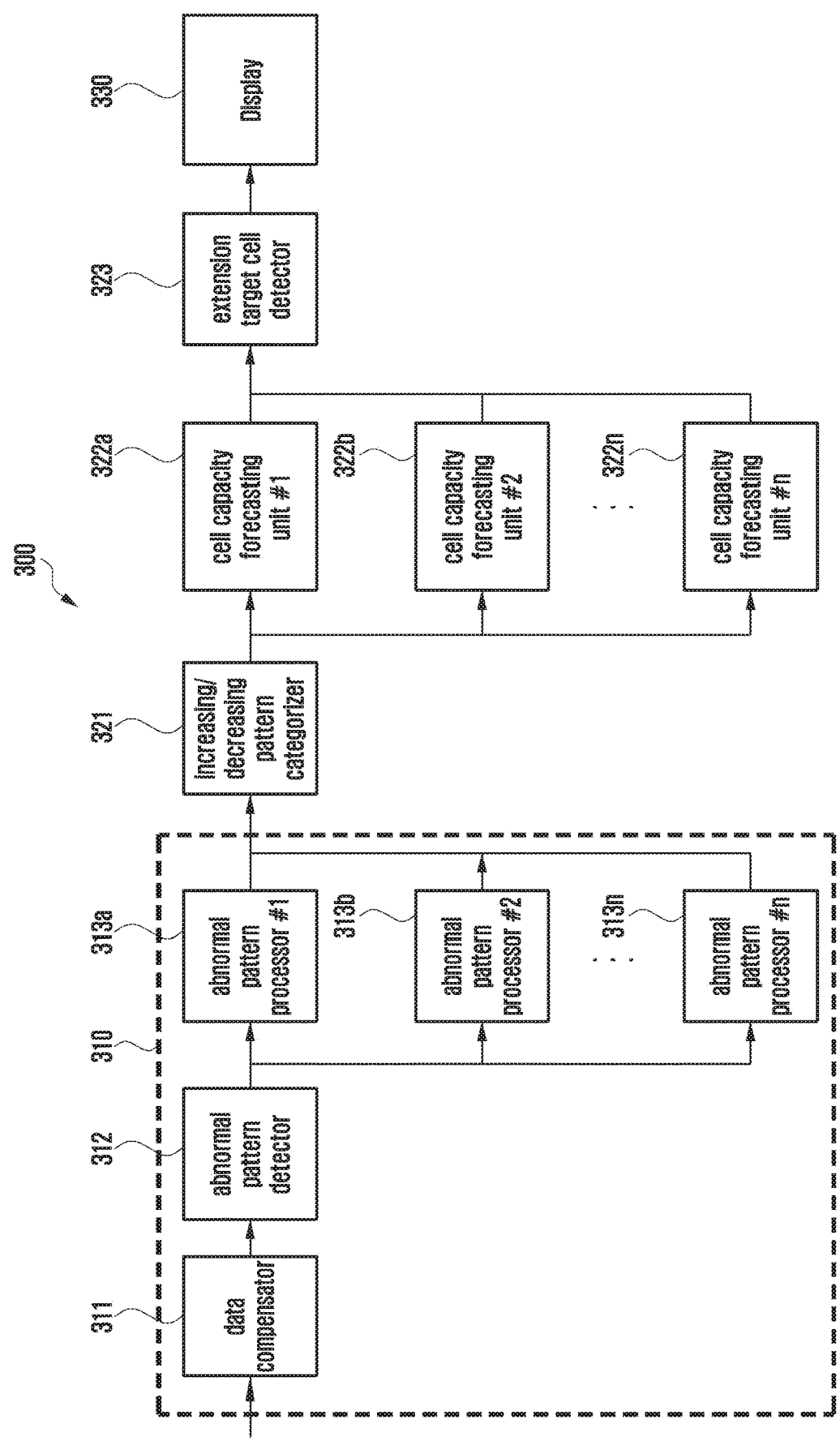
FIG. 3 is a block diagram illustrating a configuration of a cell capacity saturation forecasting device according to an embodiment of the disclosure.
Figure 4:
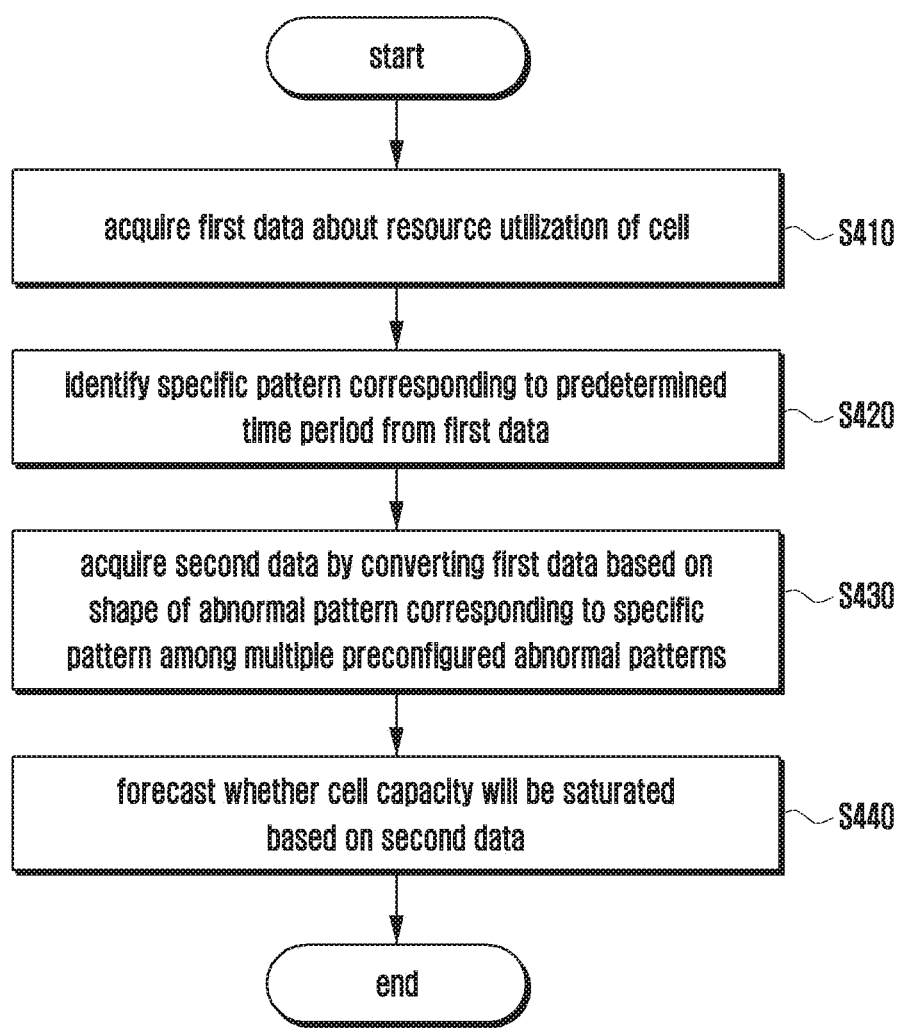
FIG. 4 is a flowchart illustrating a method for processing data with which an abnormal pattern is detected according to an embodiment of the disclosure.

FIG. 3 is a block diagram illustrating a configuration of a cell capacity saturation forecasting device according to an embodiment of the disclosure, and FIG. 4 is a flowchart illustrating a method for processing data with which an abnormal pattern is detected according to an embodiment of the disclosure.

Figure 5A:
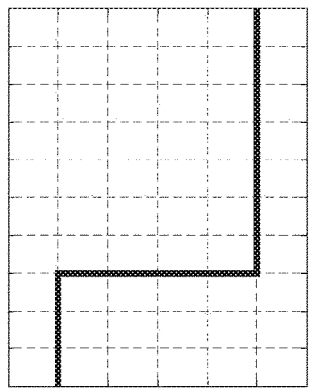
FIG. 5A is a diagram illustrating predetermined abnormal patterns according to an embodiment of the disclosure.
Figure 5A:
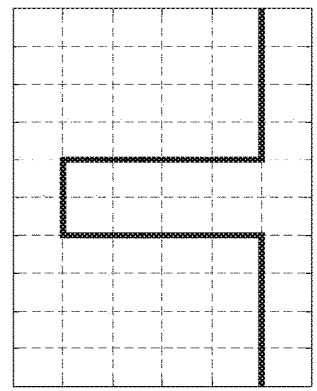
Figure 5A:
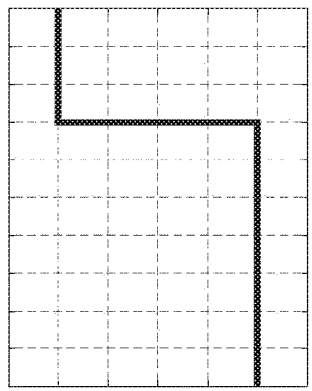
Figure 5A:
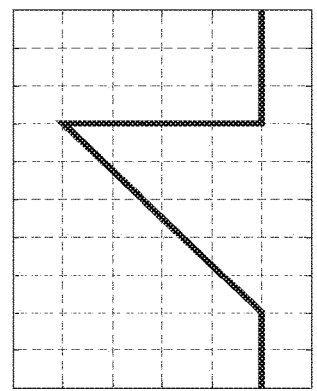
Figure 5A:
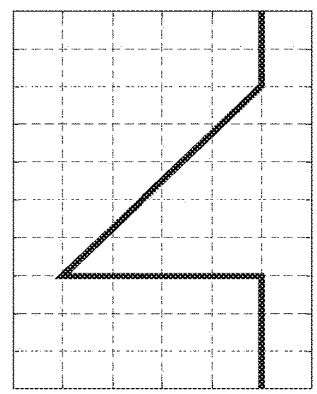
Figure 5A:
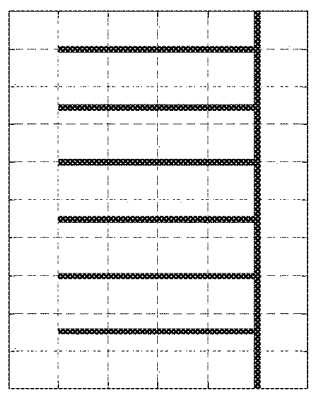
Figure 5B:
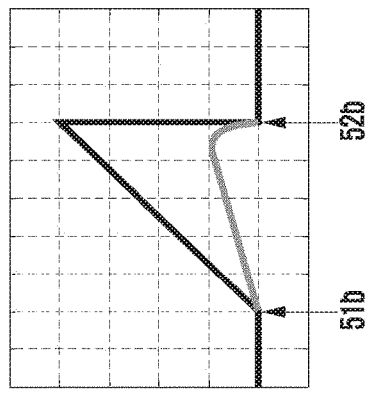
FIG. 5B is a diagram illustrating abnormal pattern-specific data processing schemes according to an embodiment of the disclosure.
Figure 5B:
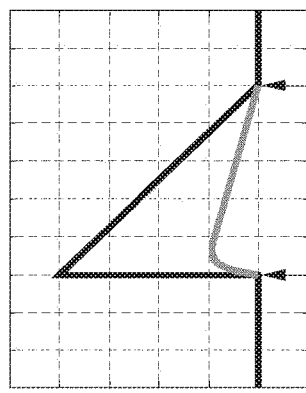
Figure 5B:
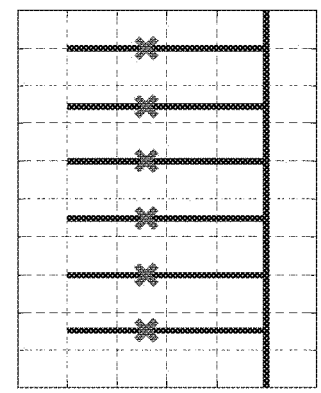
Figure 5B:
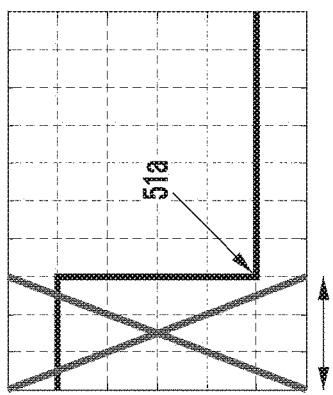
Figure 5B:
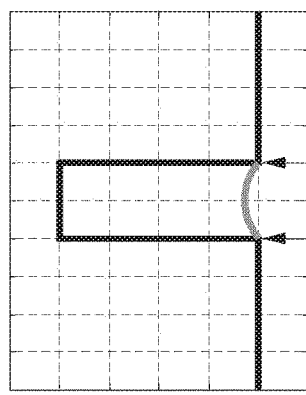
Figure 5B:
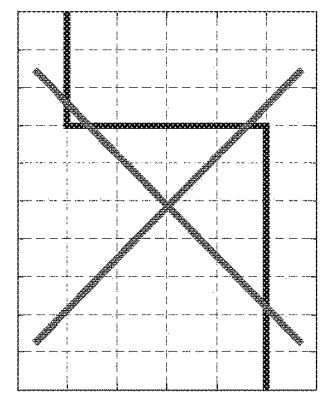

FIG. 5A is a diagram illustrating predetermined abnormal patterns according to an embodiment of the disclosure, and FIG. 5B is a diagram illustrating abnormal pattern-specific data processing schemes according to an embodiment of the disclosure.

Referring to FIG. 3, the forecasting device 300 may include at least one pattern detector 310, a saturation forecasting unit (not shown), and a display 330 as described with reference to FIG. 2B. According to an embodiment, the saturation forecasting unit may include an increasing/decreasing pattern categorizer 321, a plurality of cell capacity forecasting units 322a, 322b, . . . , 322n, and an extension target cell detector 323. A configuration of the saturation forecasting unit proposed in an embodiment is described later with reference to FIG. 6.

Referring to FIG. 3, the pattern detector 310 may include a data compensator 311, an abnormal pattern detector 312, and a plurality of abnormal pattern processors 313a, 313b, . . . , 313n.

In detail, the data compensator 311 may acquire resource utilization-related data about cellular radio communication from a cell as a target for saturation forecasting. The data compensator 311 may deduce or identify a certain pattern corresponding to the acquired data by applying a predetermined algorithm to the acquired data. Examples of the predetermined algorithm may include long short term memory (LSTM) and a gated recurrent unit (GRU).

According to an embodiment, after the certain pattern corresponding to the acquired data is identified, the abnormal pattern detector 312 may retrieve a pattern most similar to the certain pattern among the multiple predetermined abnormal patterns. In an embodiment, the multiple predetermined patterns are patterns of events occurring temporarily or periodically in resource utilization of a cell, which are described later with reference to FIG. 5A.

According to an embodiment, if an abnormal pattern detector 312 retrieves an abnormal pattern corresponding to the specific pattern, it may send the data with the certain pattern to an abnormal pattern processor corresponding to the retrieved abnormal pattern. According to an embodiment, the multiple abnormal pattern processors 313a, 313b, . . . , 313n are respectively mapped to multiple patterns preconfigured to the forecasting device 300. The abnormal pattern processor corresponding to the retrieved abnormal pattern may perform a conversion operation on the certain pattern to remove data associated with the abnormal pattern. In an embodiment, the conversion operation may vary according to the shape of the corresponding abnormal pattern. The conversion operation is described later in more detail with reference to FIG. 5B.

Descriptions are made of the operations of the aforementioned components hereinafter with reference to FIG. 4.

Referring to FIG. 4, the forecasting device may acquire first data about per-cell resource utilization at operation S410.

The first data may be the data about resource utilization in a cell during a period of at least 4 weeks. In an embodiment, data about daily resource utilization may be determined based on per-cell resource utilization with the largest operation rate among per-cell resource utilizations (PRB utilization) being collected by unit of time. The first data may also be data including a set of resource utilizations of the corresponding and neighboring cells.

At operation S420, the forecasting device may deduce or identify a certain pattern corresponding to a predetermined time period from the first data.

In an embodiment, the certain pattern may be identified using the aforementioned algorithm. For example, it may be possible to acquire a pattern first through time series analysis on consecutive resource utilization values of a target cell for analysis and search for a candidate abnormal period. If a candidate abnormal period is detected in the acquired pattern, it may be possible to determine whether a predetermined event (e.g., breakdown and shutdown) has occurred at a data point of a time series of resource utilizations of neighboring cells during the candidate abnormal period. If a predetermined event is detected in a neighboring cell during the candidate abnormal period, it may be possible to identify that the part including the candidate abnormal period in the acquired pattern is a certain pattern.

According to an embodiment, if the certain pattern is identified, the forecasting device may retrieve an abnormal pattern corresponding to the certain pattern among the multiple predetermined abnormal patterns and convert the first data to second data at operation S430 based on the shape of the retrieved abnormal pattern and forecast whether cell capacity will be saturated based on the second data at operation S440.

That is, the first data may be converted in a different manner in accordance with the abnormal pattern corresponding thereto among the multiple predetermined abnormal patterns.

According to an embodiment, the abnormal patterns, referring to FIG. 5A, may include a first pattern in the shape of L with only an end point as shown in part (a), second pattern in the form of M with a start point and an end point as shown in part (b1), (b2) and (b3), a third pattern in the form of r with only a start point as shown in part (c), and a fourth pattern including periodic events as shown in part (d).

For example, the first pattern may be deduced in an abnormal situation where a neighboring cell that operates abnormally because of a certain reason such as a breakdown is recovered through a measurement. For example, the second pattern may be deduced in an abnormal situation where a problem that arises in a neighboring cell is gradually recovered through a measurement such as settings optimization or a new cell is deployed in an area where a number of users connected to the target cell for forecasting is gradually increasing in the case where a medium- and long-term event has occurred in the area including the target cell for forecasting. For example, the third pattern may be deduced in a situation where a neighboring cell operates abnormally because of a certain reason such as a breakdown without being recovered to the normal state, and the fourth pattern may be deduced in a situation where a short-term event occurs periodically in the corresponding area.

According to an embodiment, the forecasting device may retrieve an abnormal pattern most similar to the certain pattern deduced from the first data among the multiple abnormal patterns. Once the abnormal pattern corresponding to the certain pattern is retrieved, the forecasting device may convert the first data using a data conversion scheme corresponding to the retrieved abnormal pattern.

In detail, if the first pattern is retrieved as the abnormal pattern corresponding to the certain pattern, the abnormal pattern processor corresponding to the first pattern may remove a section corresponding to the time period before the end point of the certain pattern corresponding to the first data to acquire the second data. That is, it may be possible to perform an operation of removing a section 51 before the end point 51a of the pattern as shown in part (a) of FIG. 5B. This means removing data corresponding to a time period before a reference time point from the collected data having the first pattern in the shape of L with no start point, before input for forecast modeling, which may increase the forecasting accuracy.

As another example, if the second pattern is retrieved as the abnormal pattern corresponding to the certain pattern, the abnormal pattern processor corresponding to the second pattern may remove a section corresponding to the time period before a start point and a section corresponding to the time period before an end point of the certain pattern corresponding to the first data. Next, a weighting value is applied to the first data from which the sections corresponding to the time periods were removed to acquire the second data.

That is, it may be possible perform a conversion first on the first data by removing the section before the start point 52a and the section before the end point 52b from the corresponding pattern to leave the section between the start and end points 52a and 52b. Next, a predetermined weight value is applied to the first converted first data to acquire the second data. Here, the predetermined weighting value may be applied using a weighted moving average algorithm.

In more detail, the predetermined weighting value may be applied in a different manner according to the shape of the certain pattern. For example, in the case where the certain pattern has the shape of a curve as shown in the first graph in part (b) of FIG. 5B, the predetermined weighting value may be applied in accordance with a normal distribution between the start and end points 52a and 52b of the pattern. In the case where the certain pattern has the shape of a curve as shown in the second graph in part (b) of FIG. 5B, the predetermined weighting value may be applied at the start point 52a of the pattern. As another example, in the case where the certain pattern has the shape of a curve as shown in the third graph in part (b), the predetermined weighting value may be applied at the end point 52b of the pattern.

Meanwhile, if the third pattern is retrieved as the abnormal pattern corresponding to the certain pattern, the abnormal pattern processor corresponding to the third pattern may remove the first data without any conversion. This is because forecasting a situation in the future based on the abnormal pattern caused by an event continuously occurring currently degrades reliability. Accordingly, the abnormal pattern processor corresponding to the third pattern may display a message indicating the impossibility of forecast modeling for the corresponding cell and skip creating any model. In this case, the forecasting operation may be restarted after the cause of the forecasting impossibility, such as a breakdown of a neighboring cell, is removed.

As another example, if the fourth pattern is retrieved as the abnormal pattern corresponding to the certain pattern, the abnormal pattern processor corresponding to the fourth pattern may remove data identified by the abnormal pattern occurring periodically from the first data to acquire the second data without applying any weighting value.

As described above, if an abnormal pattern is detected by the abnormal pattern detector, the corresponding data is converted in a different manner in accordance with the abnormal pattern and then sent to the saturation forecasting unit.

Figure 6:
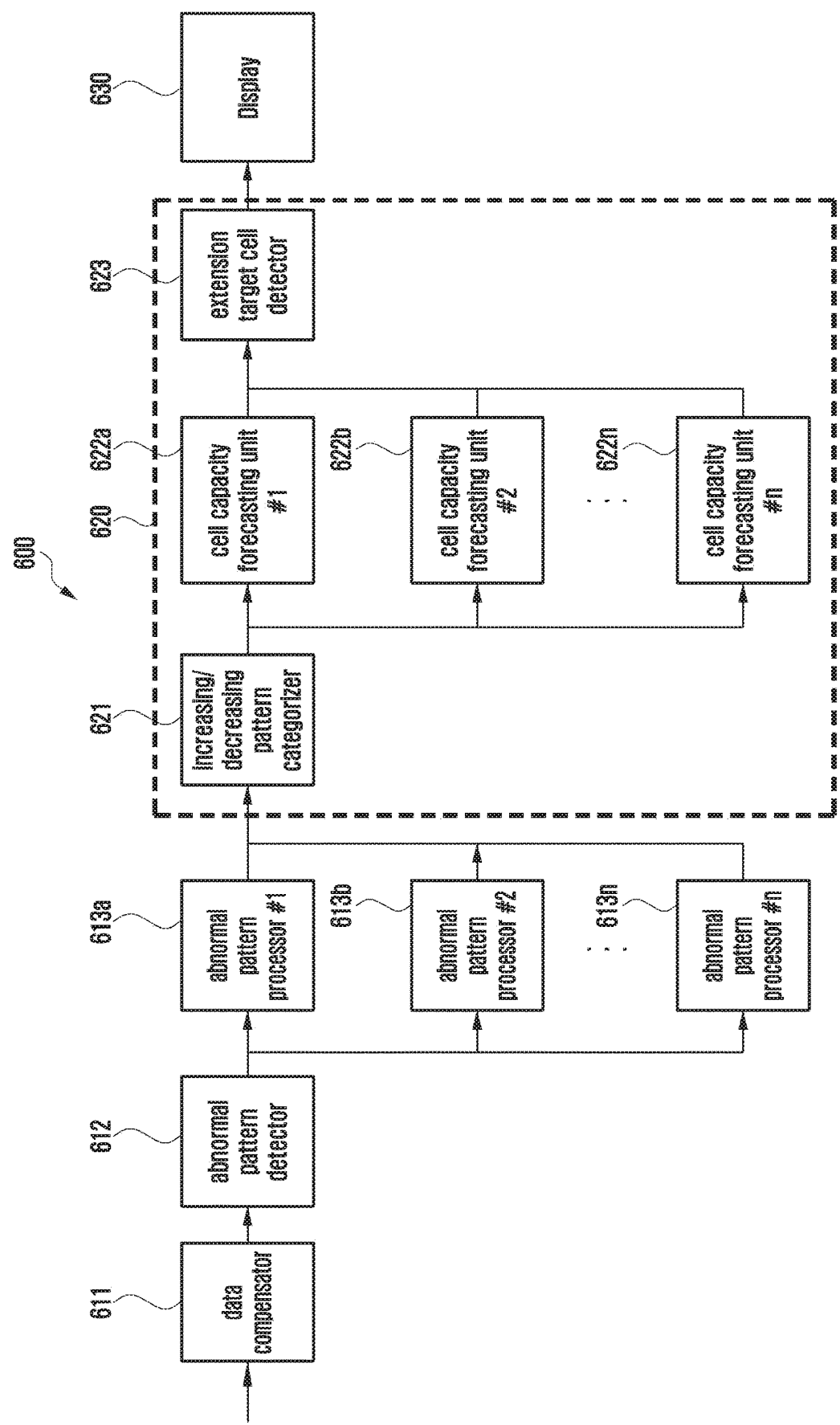
FIG. 6 is a block diagram illustrating a configuration of a cell capacity saturation forecasting device according to an embodiment of the disclosure.
Figure 7:
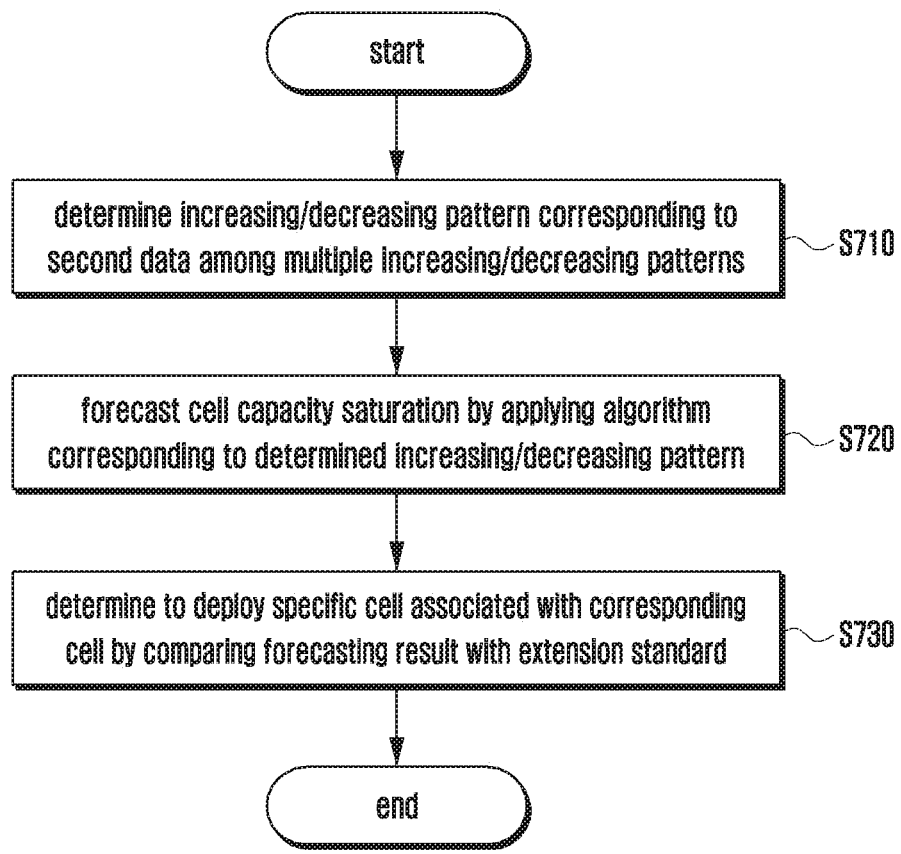
FIG. 7 is a flowchart illustrating a method for forecasting cell capacity saturation according to an embodiment of the disclosure.

FIG. 6 is a block diagram illustrating a configuration of a cell capacity saturation forecasting device according to an embodiment of the disclosure, and FIG. 7 is a flowchart illustrating a method for forecasting cell capacity saturation according to an embodiment of the disclosure.

Figure 8:
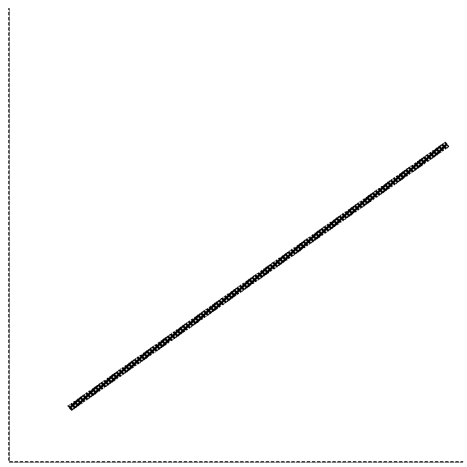
FIG. 8 illustrates increasing/decreasing patterns of cell capacity saturation according to various embodiments of the disclosure.
Figure 8:
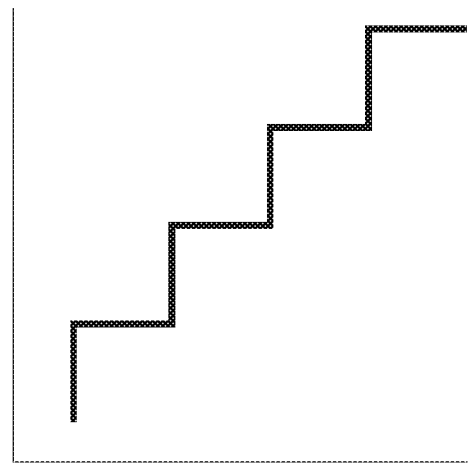
Figure 8:
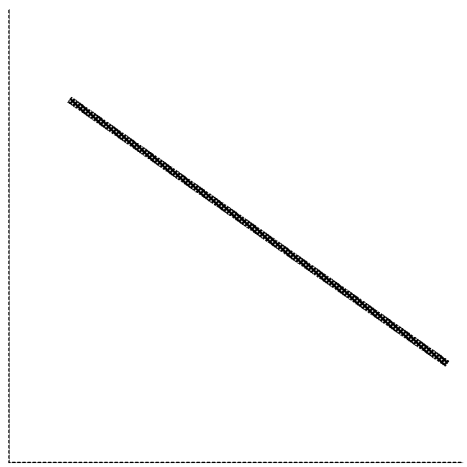
Figure 8:
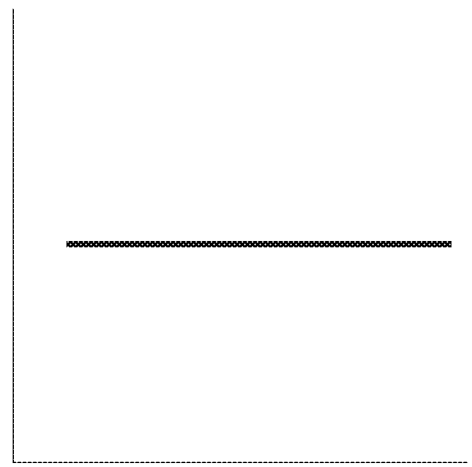
Figure 9:
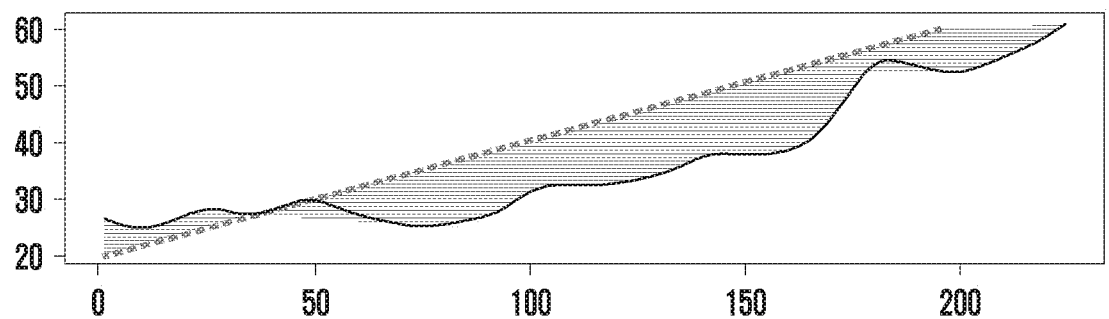
FIG. 9 is a diagram illustrating graphs showing increasing/decreasing patterns acquired from resource utilization data of a cell according to an embodiment of the disclosure.
Figure 9:
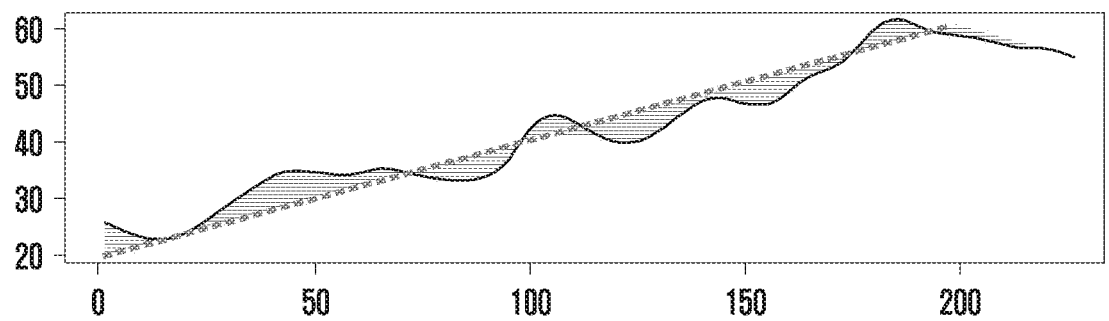
Figure 9:
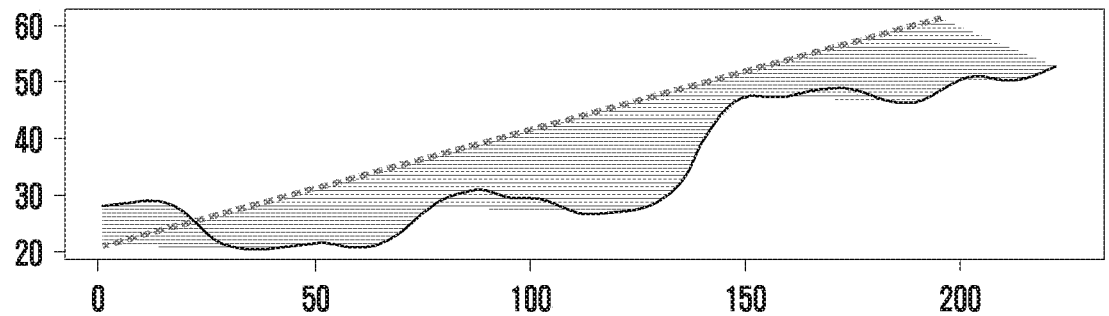

FIG. 8 illustrates exemplary increasing/decreasing patterns of cell capacity saturation according to various embodiments of the disclosure, and FIG. 9 is a diagram illustrating graphs showing increasing/decreasing patterns acquired from resource utilization data of a cell according to an embodiment of the disclosure. The descriptions given above are omitted herein to avoid redundancy.

Referring to FIG. 6, the forecasting device 600 may include a saturation forecasting unit 620 for forecasting cell capacity saturation and making a determination about deployment of a new cell. According to an embodiment, the saturation forecasting unit 620 may include an increasing/decreasing pattern categorizer 621, a plurality of cell capacity forecasting units 622a, 622b, . . . , 622n, and an extension target cell detector 623.

According to various embodiments, if data processed in an abnormal pattern-specific manner is received from the data compensator 611 via the abnormal pattern detector 612 and the abnormal pattern processors 613a, 613b, . . . 613n, the increasing/decreasing pattern categorizer 621 may retrieve an increasing/decreasing pattern corresponding to the processed data from among multiple increasing/decreasing patterns. In an embodiment, the multiple increasing/decreasing patterns may be configured through a learning process that operates in such a way of collecting and categorizing data about real KPI increasing/decreasing patterns. The multiple increasing/decreasing patterns are categorized because integrated modeling with various patterns may degrade performance in forecasting a time series change. The multiple increasing/decreasing patterns are described later with reference to FIG. 8.

According to an embodiment, if an increasing/decreasing pattern corresponding to the processed data is determined, the increasing/decreasing pattern categorizer 621 may send the corresponding data to a cell capacity forecasting unit corresponding to the determined increasing/decreasing pattern. According to an embodiment, multiple cell capacity forecasting units 622*a* 622*b*, . . . , 622*n* may forecast cell capacity saturations based on data corresponding to the respective increasing/decreasing patterns. For example, the cell capacity forecasting units 622*a*, 622*b*, . . . , 622*n* may each compare the corresponding data and reference increasing/decreasing reference patterns using an algorithm capable of time series forecasting. The cell capacity saturation forecasting method is described later in more detail with reference to FIG. 9.

Afterward, the cell capacity forecasting unit may send the forecasting result to the extension target cell detector 623. According to an embodiment, if it is determined that the corresponding data exceeds the increasing/decreasing reference based on the forecasting result received, the extension target cell detector 523 may determine the necessity of deployment of a new cell associated with the target cell for forecasting. For example, the extension target cell detector 623 may make a determination to deploy a neighboring cell for distributing the load of the target cell for forecasting within an area in which the target cell for forecasting is located and provide the determination information to the display 630.

Hereinafter, the above operations are described in more detail with reference to FIG. 7.

Referring to FIG. 7, the forecasting device may determine, at operation S710, an increasing/decreasing pattern corresponding to second data obtained by performing abnormal pattern-specific processing on the data among multiple increasing/decreasing patterns.

According to an embodiment, the multiple increasing/decreasing patterns are exemplified as shown in FIG. 8. Referring to FIG. 8, the multiple increasing/decreasing patterns may include a right-upward increasing pattern as shown in part (a) of FIG. 8, a right-upward stepwise increasing pattern as shown in part (b) of FIG. 8, a right-downward decreasing pattern as shown in part (c) of FIG. 8, and a parallel pattern as shown in part (d) of FIG. 8. Here, the individual increasing/decreasing patterns are generated by generalizing multiple KPI data-learning results based on daily data necessary for forecasting.

According to an embodiment, the forecasting device may determine an increasing/decreasing pattern corresponding to the second data by applying an algorithm capable of performing a distance comparison between patterns on the acquired second data. Examples of the algorithm may include LSTM and dynamic time warping (DTW). For example, in reference to graphs depicted in FIG. 9, the distance between patterns on the second data according to the DTW algorithm shows a right-upward increasing/decreasing pattern.

According to an embodiment, if an increasing/decreasing pattern corresponding to the second data is determined as described above, the forecasting device may forecast, at operation S720, a cell capacity saturation by applying an algorithm corresponding to the determined increasing/decreasing pattern.

For example, the forecasting device may forecast the resource utilization during a predetermined period (e.g., about 4 weeks) after applying the algorithm corresponding to the determined increasing/decreasing pattern. Here, the cell capacity saturation may be forecast by applying an algorithm using a model or parameter optimized for determined increasing/decreasing pattern. This aims to solve the problem of forecasting accuracy degradation caused by not being able to sufficiently reflect per-pattern characteristics.

According to an embodiment, examples of the algorithm corresponding to the increasing/decreasing pattern may include a time series forecasting algorithm such as LSTM, deep neural network (DNN), and autoregressive integrated moving average (ARIMA). Each algorithm may be a model obtained by pre-learning the actual data collected per increasing/decreasing pattern.

According to an embodiment, if the cell capacity saturation during the predetermined period is forecast, the forecasting device may, at operation S730, compare the forecasting result with an extension standard to make a determination about deployment of a new cell associated with the corresponding cell.

For example, if it is determined that the resource utilization of the target cell for forecasting during the predetermined period satisfies a predetermined standard, the forecasting device may determine the necessity of deployment of a new cell for distributing the load of the target cell for forecasting. In an embodiment, the predetermined standard may be a condition that the resource utilization of a cell that is equal to or greater than a threshold value lasts over a predetermined period within a predetermined forecast target period. In more detail, if daily resource utilization of the target cell for forecasting that is equal to or greater than a threshold value (e.g., 70%) lasts for 5 days or longer in a window of about one week before a deployment due date, the forecasting device may determine a necessity of deployment of a new cell.

If the number of cells to be deployed as a result of forecasting capacity saturations of multiple cells exceeds a predetermined deployment limit (e.g., number of extension target cells), the forecasting device may determine cells to be deployed in a highest-priority order of forecast resource utilization of the cells.

Figure 10:
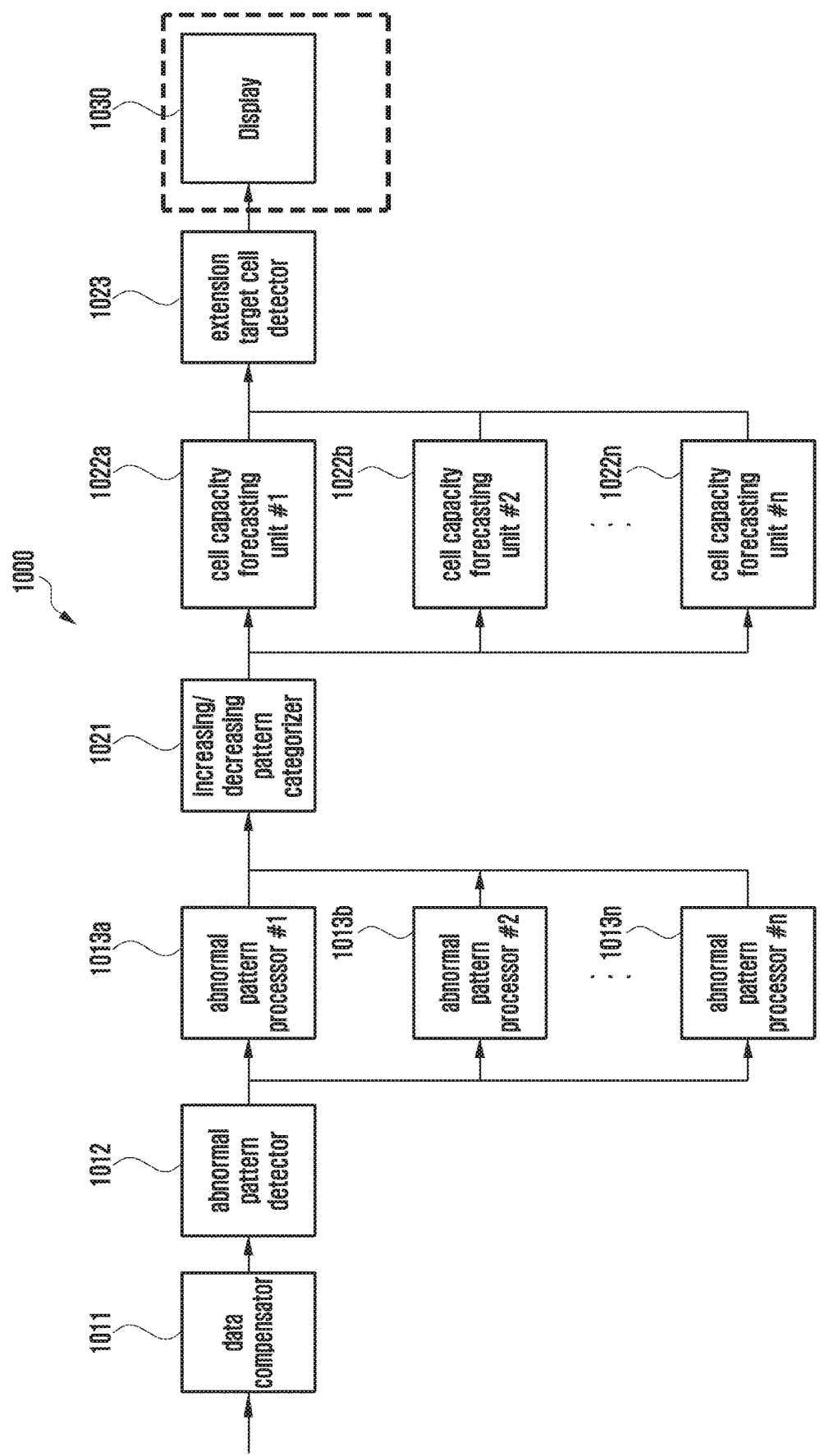
FIG. 10 is a block diagram illustrating a configuration of a cell capacity saturation forecasting device according to an embodiment of the disclosure.
Figure 11:
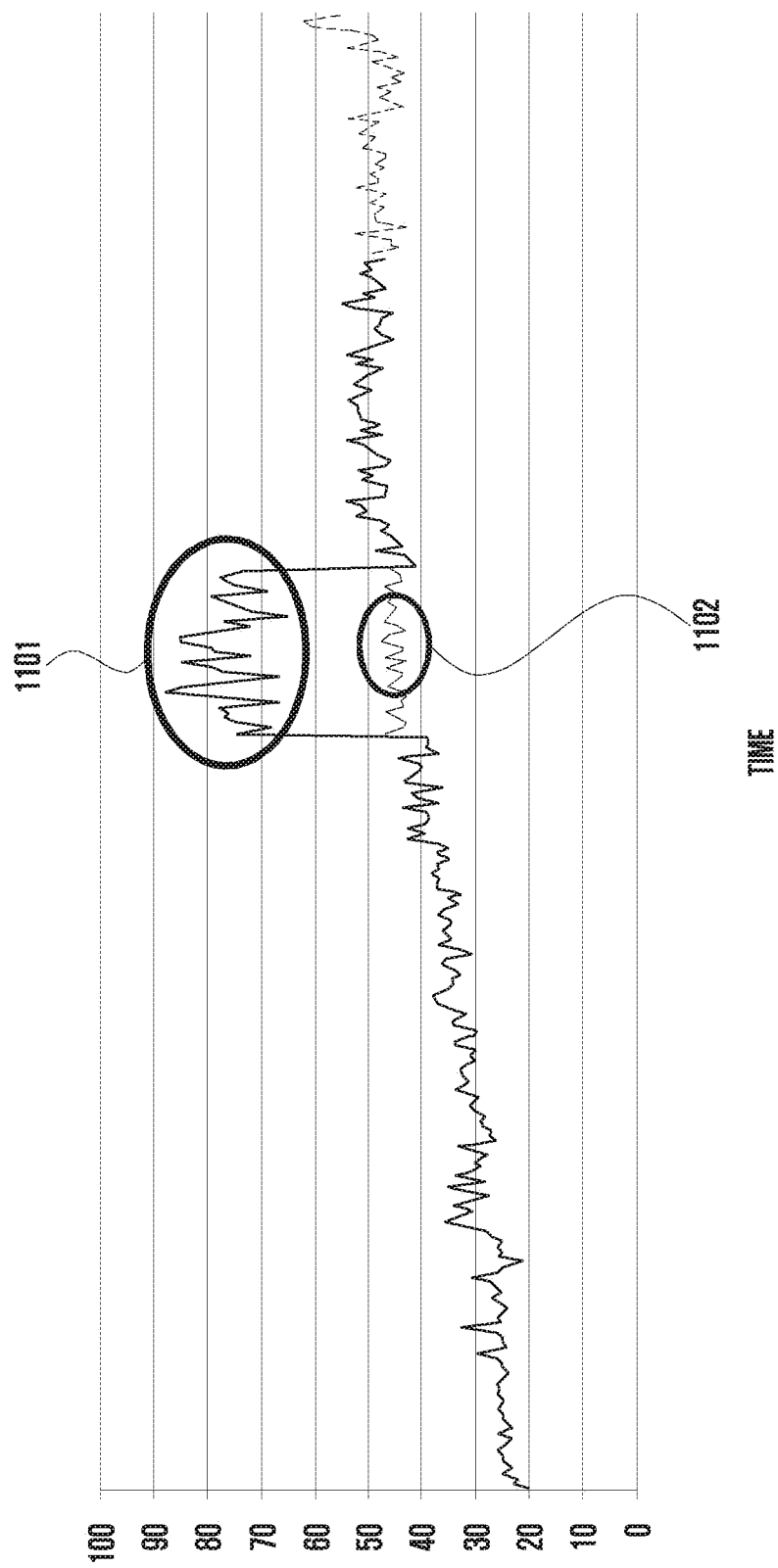
FIG. 11 is a diagram illustrating a change of cell capacity saturation according to an embodiment of the disclosure.

FIG. 10 is a block diagram illustrating a configuration of a cell capacity saturation forecasting device according to an embodiment of the disclosure, and FIG. 11 is a diagram illustrating a change of cell capacity saturation according to an embodiment of the disclosure.

Referring to FIG. 10, the forecasting device 1000 may include a data compensator 1011, an abnormal pattern detector 1012, abnormal pattern processors 1013*a*, 1013*b*, . . . 1013*n*, a saturation forecasting unit, an increasing/decreasing pattern categorizer 1021, cell capacity forecasting units 1022*a*, 1022*b*, . . . 1022*n*, extension target cell detector 1023, and a display 1030 that receives information on a saturation forecast result from the saturation forecasting unit and displays the information to the user.

According to an embodiment, the display 1030 may display information on a current cell capacity of a target cell for forecasting, information on base stations within an area where the target cell for forecasting is deployed, information on a cell capacity saturation forecast in the target cell for forecasting, and information on a deployment rank and extension target cell in the form of a table or map.

Referring to FIG. 11, the display 1030 may display a graph schematizing a time series of cell capacity saturation of the target cell for forecasting to the user. For example, as shown in FIG. 11, the resource utilization of the target cell for forecasting may gradually increase such that the cell capacity is saturated during a certain period as denoted by reference number 1101. If a new cell (e.g., a neighboring cell that is capable of distributing the load of the target cell for forecasting) is deployed associated with the target cell for forecasting before the certain period, the cell capacity of the target cell for forecasting may not be saturated during the certain period as denoted by reference number 1102 and may maintain appropriate resource utilization.

As described above, the proposed method and apparatus according to an embodiment is advantageous in terms of improving an abnormal pattern detection accuracy by processing cell data in an abnormal pattern-specific manner.

The proposed method and apparatus according to an embodiment is also advantageous in terms of improving cell saturation forecast accuracy by forecasting cell saturation in such a way of categorizing data processed per abnormal pattern into one of cell saturation increment and decrement patterns.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for forecasting saturation of a cell capacity in a wireless communication system, the method comprising:
    acquiring first data related to resource utilization of a cell from the cell;
    identifying a specific pattern corresponding to a predetermined time period from the first data;
    acquiring second data by converting the first data based on a shape of an abnormal pattern corresponding to the specific pattern among multiple preconfigured abnormal patterns; and
    forecasting whether the cell capacity is saturated based on the second data.

2. The method of claim 1, wherein the multiple preconfigured abnormal patterns include a first pattern in a shape of L with only an end point and a second pattern in a shape of M with a start point and an end point.

3. The method of claim 2, wherein the acquiring of the second data further comprises acquiring the second data by removing a time period before the end point of the specific pattern from the first data in a case that the abnormal pattern corresponding to the specific pattern is the first pattern.

4. The method of claim 2, wherein the acquiring of the second data further comprises:
    in a case that the abnormal pattern corresponding to the specific pattern is the second pattern:
        removing a first time period before the start point of the specific pattern and a second time period after the end point of the specific pattern from the first data, and
        applying a preconfigured weighting value to the specific pattern.

5. The method of claim 4, wherein the preconfigured weighting value is applied to at least one of the start point of the specific pattern, the end point of the specific pattern, or a section between the start and end points of the specific pattern.

6. The method of claim 1, wherein the forecasting of whether the cell capacity is saturated further comprises:
    determining an increasing/decreasing pattern corresponding to the second data among multiple increasing/decreasing patterns, and
    determining whether the cell capacity is saturated by applying an algorithm corresponding to the determined increasing/decreasing pattern.

7. The method of claim 6, further comprising:
    determining deployment of a specific cell associated with the cell in a case that the cell capacity is saturated,
    wherein the algorithm corresponding to the determined increasing/decreasing pattern comprises at least one of long short-term memory (LSTM), deep neural network (DNN), or autoregressive integrated moving average (ARIMA).

8. An apparatus for forecasting saturation of a cell capacity in a wireless communication system, the apparatus comprising:
    an abnormal pattern detector configured to:
        acquire first data related to resource utilization of a cell from the cell,
        identify a specific pattern corresponding to a predetermined time period from the first data, and
        acquire second data by converting the first data based on a shape of an abnormal pattern corresponding to the specific pattern among multiple preconfigured abnormal patterns; and
    a saturation forecasting unit configured to forecast whether the cell capacity is saturated based on the second data.

9. The apparatus of claim 8, wherein the multiple preconfigured abnormal patterns include a first pattern in a shape of L with only an end point and a second pattern in a shape of M with a start point and an end point.

10. The apparatus of claim 9, wherein the abnormal pattern detector is further configured to acquire the second data by removing a time period before the end point of the specific pattern from the first data in a case that the abnormal pattern corresponding to the specific pattern is the first pattern.

11. The apparatus of claim 8, wherein the abnormal pattern detector is further configured to:
    in a case that the abnormal pattern corresponding to the specific pattern is the second pattern:
        acquire the second data by removing a first time period before the start point of the specific pattern and a second time period after the end point of the specific pattern from the first data, and
        apply a preconfigured weighting value to the specific pattern.

12. The apparatus of claim 11, wherein the abnormal pattern detector is configured to apply the preconfigured weighting value to at least one of the start point of the specific pattern, the end point of the specific pattern, or a section between the start and end points of the specific pattern according to a shape of the specific pattern.

13. The apparatus of claim 8, wherein the saturation forecasting unit is further configured to:
    determine an increasing/decreasing pattern corresponding to the second data among multiple increasing/decreasing patterns, and
    determine whether the cell capacity is saturated by applying an algorithm corresponding to the determined increasing/decreasing pattern.

14. The apparatus of claim 13,
    wherein the saturation forecasting unit is further configured to determine deployment a specific cell associated with the cell in a case that the cell capacity is saturated, and
    wherein the algorithm corresponding to the determined increasing/decreasing pattern comprises at least one of long short-term memory (LSTM), deep neural network (DNN), or autoregressive integrated moving average (ARIMA).

* * * * *

UNITED STATES PATENT AND TRADEMARK OFFICE
CERTIFICATE OF CORRECTION

PATENT NO.           : 10,812,989 B2                                           Page 1 of 1
APPLICATION NO.      : 16/736236
DATED                : October 20, 2020
INVENTOR(S)          : Seoungho Jeong et al.

It is certified that error appears in the above-identified patent and that said Letters Patent is hereby corrected as shown below:

On the Title Page

Item (72) The name of the inventor Seoungho JEONG is misspelled. The correct spelling is
--Seungho JEONG--.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*